W. O. FOSS.
CLUTCH.
APPLICATION FILED MAY 20, 1911.
1,055,626.
Patented Mar. 11, 1913.
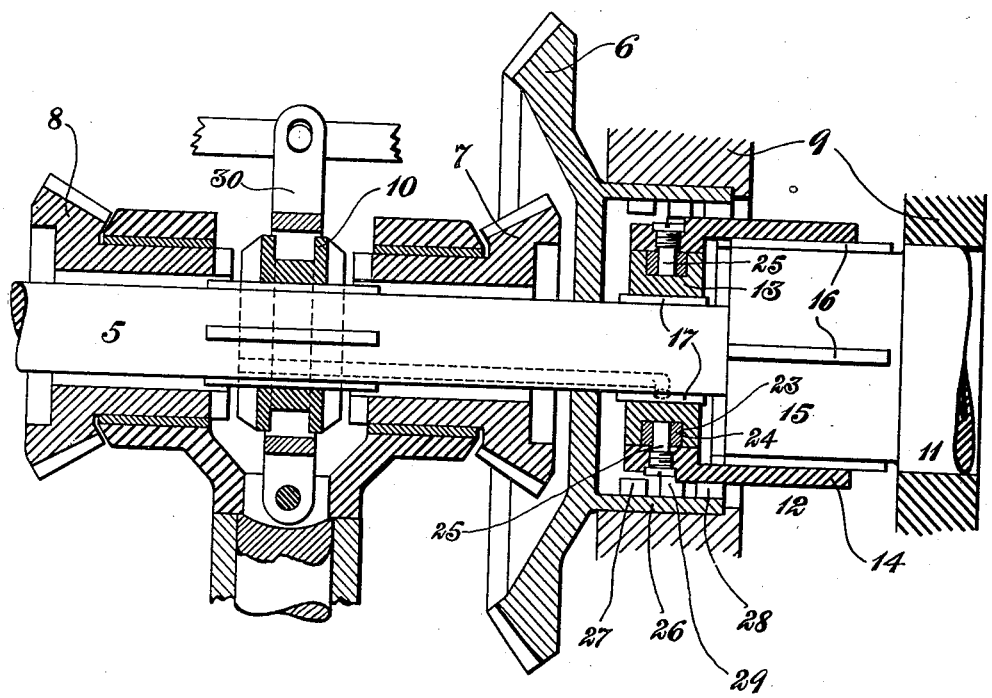
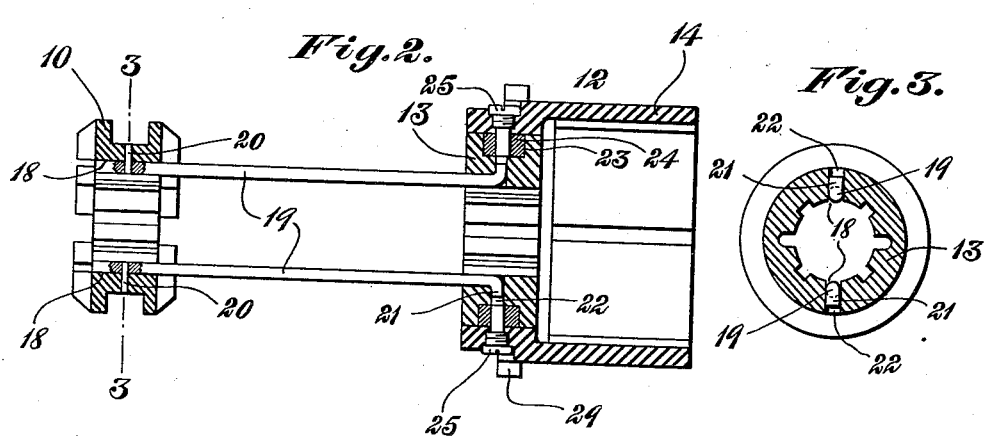
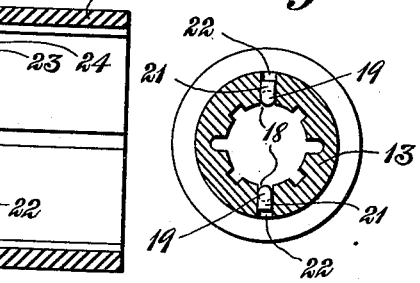
Witnesses:
L. L. Markel.
E. J. Harriott.
Inventor:
Walter O. Foss
By his Attorneys,
Sutherland & Anderson.

UNITED STATES PATENT OFFICE.

WALTER O. FOSS, OF BRANFORD, CONNECTICUT, ASSIGNOR TO CHARLES E. BUNNELL AND RICHARD BRADLEY, OF BRANFORD, CONNECTICUT.

CLUTCH.

1,055,626. Specification of Letters Patent. Patented Mar. 11, 1913.

Original application filed March 2, 1911, Serial No. 611,932. Divided and this application filed May 20, 1911. Serial No. 628,513.

*To all whom it may concern:*

Be it known that I, WALTER O. FOSS, a citizen of the United States, residing at Branford, in the county of New Haven and State of Connecticut, have invented certain new and useful Improvements in Clutches, of which the following is a specification.

This invention relates to clutches, the object of the invention being to provide an effective article of this character which is susceptible of easy and ready operation to throw different power transmitting members into and out of operative relation.

In the drawings accompanying and forming part of the present specification I have shown in detail one convenient form of embodiment of the invention which to enable those skilled in the art to practice the same will be set forth fully in the following description, while the novelty of the invention will be included in the claim succeeding said description. From this observation it will be apparent that I do not restrict myself to the disclosures made by said drawings and description; I may deviate therefrom in various particulars within the scope of my invention covered in said claim.

Referring to said drawings: Figure 1 is a longitudinal sectional view of a clutch embodying my invention and showing the same associated with power-transmitting members and certain coöperating devices. Fig. 2 is a similar view of the clutch separated from the other parts with a companion clutch and connections between the two. Fig. 3 is a cross section on the line 3—3 of Fig. 2.

Like characters refer to like parts throughout the several figures of the drawings.

In a copending application for patent for driving mechanism, filed March 2, 1911, Serial No. 611,932 and of which the present case is a division, I have illustrated an organization in conjunction with which a clutch comprising the present invention can be advantageously utilized. This clutch, however, can be used in various other connections. To aid in the understanding of the device I will briefly describe the parts shown in Fig. 1 and with which the clutch may be associated. In this view the numeral 5 denotes a shaft, and it is generally my custom to continuously rotate the same. Surrounding the shaft 5 are three bevel gears 6, 7, and 8 which are carried by relatively stationary bearings which may constitute a part of or be sustained by the casing 9 of the driving mechanism and which is partially shown in said Fig. 1. The shaft 5 is rotative with respect to the three bevel gears 6, 7 and 8 and as shown in the parent application to which I have already alluded, the gears 7 and 8 are at all times operatively connected with the gear 6 by means which I have not shown as the same forms in itself no part of the present invention, although I might add by way of explanation, that in the case of an "automobile drive" as it is known, the automobile will be driven forward at a slow or its lowest speed when the bevel gear 7 is put into active relation with the bevel gear 6, while the car will be reversed when the bevel gear 8 is thrown into working connection with said bevel gear 6, these results being accomplished by alternately clutching the gears 7 and 8 to the shaft 5 through the medium of a clutch device 10 which has a slidable, splined connection with the shaft 5. In the said prior application the power or main shaft has associated therewith two gears which have a constant driving connection with gears connected with the axle, and said two gears on said power shaft are adapted to be alternately clutched to the said power shaft. When one of said first mentioned gears is clutched to the shaft, the vehicle is driven forward at a high speed, and when the other is clutched to said shaft, the vehicle is driven forward at its intermediate speed. The shaft 5 is the counterpart of said shaft in said other application and in Fig. 1 I have shown the hub 11 of the gear which is adapted to be clutched to the shaft 5 for effecting the forward intermediate speed, but I have not deemed it necessary to show the clutch utilized in clutching said part 11 to said shaft 5. In connection with such two parts as 6 and 11 is employed in the present case, a clutch constituting the subject matter of the present case, and this clutch is denoted in a general way by 12. As illustrated it is of such character as to put the parts 6 and 11 into driving relation with each other when the clutch 10 is shifted in either direction from its neutral position, there being connections between the two clutches to assure this particular result, so that when either the speed modifying or reversing mechanism already referred to is operating the gear 6, the latter will be operatively coupled to the part 11 so that the effect of the latter can be transferred to the driven member which in the present case is an axle. The clutch device 12 as illustrated is of compound construction, one of its members or that denoted by 13 being preferably connected with the clutch 10, while the other member 14 is keyed or otherwise suitably connected with the elongated sleeve 15 of the part 11. Said sleeve 15 is shown having several external keys, each denoted by 16, to enter keyways formed within the clutch member 14 interiorly thereof. The clutch member 13 is rotative preferably with the shaft 5 and for this purpose may be keyed thereto by keys each denoted by 17, the key construction being such as to permit the member 13 to slide longitudinally of the shaft 5.

Inside the clutch device 10 are grooves 18 which receive the forward ends or shanks of rods 19 extending longitudinally of the shaft 5, said rods being fastened to the clutch device 10 in some suitable manner as by pins 20. The outer ends of said rods 19 extend into the clutch member 13 and are bent as at 21 to project into perforations 22 within said member 13. As will hereinafter appear the clutch members 13 and 14 are connected for movement together, and it, therefore, follows that when the clutch 10 is shifted in either direction from its neutral position, which it is shown as occupying in Fig. 1, the clutch 12 in its entirety will correspondingly be moved and in each of the shifts of said clutch 10 the clutch 12 becomes effective to operatively connect the part 6 to the gear 11. The rods 19 I might state extend through the central opening of the gear 6. The inner clutch member 13 is shown having an external annular groove 23 and in said groove are rotative the rollers 24 held in place by screws 25 tapped through the outer clutch member 14 from the outside thereof, the rollers being adapted to turn on the reduced portions of the screws 25. The rollers and screws present a key connection for uniting the two clutch members or as it might otherwise be stated, they present anti-friction studs by virtue of which when the member 13 is shifted the member 14 will be similarly operated.

The gear 6 is shown having a hollow, somewhat elongated hub 26, and within this hub are two sets of teeth or projections 27 and 28, while the outer clutch member 14 has external teeth 29 adapted to alternately coöperate with the sets of teeth 27 and 28.

In Fig. 1 the clutch 10 is shown as occupying its neutral position, while the clutch teeth 29 are represented as being out of engagement with both series of internal teeth 27 and 28. It will be assumed at this time that the shaft 5 is being rotated and that it is desired to drive the car forward slowly. In this event the clutch device 10 will be shifted into engagement with the gear 7 whereby the latter will be coupled to the shaft 5 and will serve through the intermediate gearing (not shown) to rotate the gear 6. On this motion of the clutch 10 the clutch device 12 through the rods 19, is shifted so as to carry the teeth 29 into the path of the teeth 28 whereby the parts 6 and 11 will be put into driving connection. It will be assumed that it is desired to reverse the car. In this case the clutch 10 is shifted to connect the gear 8 to the shaft 5, and it will be understood that this gear when thus connected serves to operate the gear 6 through said intermediate mechanism. When the clutch 10 has connected the gear 8 to the shaft 5, the clutch 12 will have been shifted through said rods 19, to put the teeth 29 into the path of the teeth 27, so that in the second case the gear 6 will be also put into operative connection with the part 11 to effect the action of the driven member of whatever character it may be. In the case of the forward high and intermediate speeds the part 11 in connection with another gear, not shown, plays a part, and at such times both clutch devices 10 and 12 occupy their neutral positions. It is not, however, necessary for me to go into this particular point as it does not concern the present invention. I have shown conventionally in Fig. 1 a clutch shifter which is denoted in a general way by 30 but which need not be described in detail as it is a very familiar device; it is employed for operating the clutch device 10.

What I claim is:

The combination of a power transferring member, a clutch section connected with said power transferring member for rotation therewith and also for shifting movement with respect thereto in the direction of the axis of rotation thereof, a second power transferring member provided with at least two teeth in different positions, said clutch section having at least one tooth adapted to coöperate with one of the teeth on the second power transferring member when said clutch section is in one position and adapted to coöperate with the other tooth on said
5 second power transferring member when said clutch section is in another position whereby the clutch section can be put into driving connection with the second power transferring member in said different positions.

In testimony whereof I affix my signature in presence of two witnesses.

WALTER O. FOSS.

Witnesses:
WILLIAM A. AHERN,
WILLIAM T. O'NEIL.

Copies of this patent may be obtained for five cents each, by addressing the "Commissioner of Patents. Washington, D. C."